(12) United States Patent
Goellner

(10) Patent No.: US 8,870,194 B2
(45) Date of Patent: Oct. 28, 2014

(54) MULTI-LOAD AUTOMATICALLY STABILIZING HAND CART WITH CUSTOM CARRYING STRUCTURES

(76) Inventor: Gary Goellner, Mentor, OH (US)

( * ) Notice: Subject to any disclaimer, the term of this patent is extended or adjusted under 35 U.S.C. 154(b) by 0 days.

(21) Appl. No.: 13/423,441

(22) Filed: Mar. 19, 2012

(65) Prior Publication Data

US 2012/0292868 A1    Nov. 22, 2012

Related U.S. Application Data

(60) Provisional application No. 61/454,489, filed on Mar. 18, 2011.

(51) Int. Cl.
| | | |
|---|---|---|
| B62B 1/08 | (2006.01) | |
| B62B 1/00 | (2006.01) | |
| B62B 1/16 | (2006.01) | |
| B62B 1/14 | (2006.01) | |
| B62B 3/06 | (2006.01) | |

(52) U.S. Cl.
CPC .................. *B62B 1/16* (2013.01); *B62B 3/0625* (2013.01); *B62B 2203/04* (2013.01); *B62B 3/0606* (2013.01); *B62B 1/14* (2013.01)
USPC ................... 280/47.19; 280/47.18; 280/47.24

(58) Field of Classification Search
CPC ........ B62B 1/18; B62B 1/002; B62B 2301/08
USPC .......... 280/47.19, 47.29, 47.23, 47.35, 47.18, 280/47.28, 47.24, 652, 47.12
See application file for complete search history.

(56) References Cited

U.S. PATENT DOCUMENTS

| | | | | | |
|---|---|---|---|---|---|
| 759,495 | A | * | 5/1904 | Baines | ........................ 414/446 |
| 780,777 | A | * | 1/1905 | Colling | ........................ 414/457 |
| 3,702,018 | A | * | 11/1972 | Wood | ......................... 280/47.34 |
| 3,856,230 | A | * | 12/1974 | Zimmer | ..................... 242/422.8 |
| 4,705,283 | A | * | 11/1987 | Kleisath | ..................... 280/47.12 |
| 5,168,601 | A | * | 12/1992 | Liu | ................. 16/445 |
| 5,427,393 | A | * | 6/1995 | Kriebel | ....................... 280/47.28 |
| 5,464,104 | A | * | 11/1995 | McArthur | .................. 211/133.3 |
| 5,595,395 | A | * | 1/1997 | Wilson | ....................... 280/47.26 |
| 5,901,730 | A | * | 5/1999 | Tisbo et al. | ................. 137/15.01 |
| 6,019,381 | A | * | 2/2000 | Krawczyk | .................. 280/47.18 |
| 6,382,642 | B1 | * | 5/2002 | Rainey | ....................... 280/47.24 |
| 6,962,353 | B1 | * | 11/2005 | Garcia | ....................... 280/47.19 |
| 7,677,591 | B2 | * | 3/2010 | Chapman | ....................... 280/652 |
| 7,722,058 | B2 | * | 5/2010 | Giampavolo | ............ 280/33.991 |
| 7,976,033 | B2 | * | 7/2011 | Alves et al. | ................. 280/47.35 |

* cited by examiner

*Primary Examiner* — Hau Phan
(74) *Attorney, Agent, or Firm* — Symbus Law Group, LLC; Clifford D. Hyra

(57) ABSTRACT

A new hand cart apparatus has a frame, two wheels connected to the frame, and a first and a second set of C-hooks connected to the frame. The first set of C-hooks is configured so that its openings face in a first direction when the frame is upright and the second set of C-hooks is configured so that its openings face in a direction opposite to the first direction when the frame is declined. The frame can be pushed forwards in an upright position to insert an object resting on the ground into the first set of C-hooks and can be pulled backwards in a declined position to an insert an object resting on the ground into the second set of C-hooks.

19 Claims, 10 Drawing Sheets

MULTI-LOAD AUTOMATICALLY STABILIZING HAND CART WITH CUSTOM CARRYING STRUCTURES

This application claims the benefit of U.S. Provisional Application No. 61/454,489, filed Mar. 18, 2011, which is hereby incorporated by reference in its entirety.

BACKGROUND

The present invention related generally to the field of transport of goods by hand, and more particularly to hand carts.

Existing hand carts suffer from a lack of flexibility and inability to maintain multiple loads balanced, upright, and separated while additional loads are lifted and while the carts are maneuvered. Needs exist for improved hand carts and accompanying carrying structures.

SUMMARY

It is to be understood that both the following summary and the detailed description are exemplary and explanatory. Neither the summary nor the description that follows is intended to define or limit the scope of the invention to the particular features mentioned in the summary or in the description.

In certain embodiments, the disclosed embodiments may include one or more of the features described herein.

A new hand cart has cradles/hooks for holding handles, which allow the handles to freely rotate as the hand cart changes angles to maintain the objects connected to the handles in an upright position.

In specific embodiments, the hooks/cradles are positioned to allow the cart to pick up multiple objects having handles off the floor or a pallet with minimal effort and to carry two standard sized toolboxes or other containers at any angle between horizontal and vertical, without the toolboxes touching each other or the cart or falling out of the hooks/cradles. The cart will balance and rest either vertically or horizontally with a load of one or two toolboxes without the toolboxes falling out, the cart has a folding handle for compact storage, the cart has zero-radius turning, and the cart has a hook for picking up and carrying buckets or other objects with wire handles. Various toolboxes and similar apparatuses with such handles are sized for use with the hand cart.

Certain embodiments include features such as the ability to pick up a second load off the ground while a first remains loaded, to maneuver the multiple loads at varying angles without interference between the loads and the cart, and to stably settle the cart in a vertical or horizontal position while carrying multiple loads.

A new hand cart apparatus has a frame, two wheels connected to the frame, and a first and a second set of C-hooks connected to the frame. The first set of C-hooks is configured so that its openings face in a first direction when the frame is upright and the second set of C-hooks is configured so that its openings face in a direction opposite to the first direction when the frame is declined. The frame can be pushed forwards in an upright position to insert an object resting on the ground into the first set of C-hooks and can be pulled backwards in a declined position to insert an object resting on the ground into the second set of C-hooks.

The cart may also include a first carrying structure having one or more handle portions, wherein the one or more handle portions are inserted in the first set of C-hooks and may include a second carrying structure having one or more handle portions, wherein the one or more handle portions are inserted in the second set of C-hooks. The first set of C-hooks may be connected to the frame by an arm. The arm may extend in a length and direction such that the second carrying structure never contacts the first carrying structure when the frame is rotated between the upright and the declined position. The second set of C-hooks may be connected to the frame above where the first set of C-hooks connects to the frame and the second carrying structure may extend lower than where the first set of C-hooks connects to the frame.

The first and second sets of C-hooks may be curved such that an object hanging from the first or second set of C-hooks will slide along the first or second set of C-hooks and remain upright when the frame is rotated between the upright position and the declined position. The two wheels may rotate in opposite directions, allowing for zero-radius turning of the frame. The first and second sets of C-hooks may be configured such that one of the sets of C-hooks is in front of the central axis of the wheels and the other set of C-hooks is behind the central axis of the wheels when the frame is in a position between the upright and declined positions.

The cart may also include a handle access groove in the frame that allows an object having projections configured to rest in the first or second set of C-hooks to be withdrawn through the frame. An indexing hinge may be attached to the frame and allow a top portion of the frame to be folded down to reduce its size for transportation and storage.

A new carrying structure has side projections and is configured to be carried by insertion of the side projections into the first or the second set of C-hooks of the hand cart. The side projections may form a handle extending the length of the carrying structure.

In a new method of using the hand cart, the frame is pushed forwards in an upright position until the first set of C-hooks surround a portion of a first object, the frame is tilted back and thereby lifts the first object, the frame is declined to a declined position where the second set of C-hooks is level with a portion of a second object, the frame is pulled backwards until the second set of C-hooks surround the portion of the second object, the frame is tilted into an intermediate position between the upright position and the declined position and thereby lifts the second object, and the frame is pushed forward to transport the first and second objects.

The portions of the first and second objects in the C-hooks may be slid as the frame is tilted, maintaining the first and second objects in n upright position at all times. The frame may be tilted into an upright position where the first object is resting on the floor and the second object is resting upright in the air and the frame may be left in that position where it stays without further application of force. The frame may be tilted into the declined position where the second object is resting on the floor and the first object is resting upright in the air and the frame may be left in that position where it stays without further application of force.

In a new hand cart method, a frame having first and a second free-rotation attachment mechanisms is pushed forwards in an upright position until the first free-rotation attachment mechanism intersects with a portion of a first object, the frame is tilted back and thereby the first object is lifted, the frame is declined to a declined position where the second free-rotation attachment mechanism is level with a portion of a second object, the frame is pulled backwards until the second free-rotation attachment mechanism intersects with the portion of the second object, the frame is tilted into an intermediate position between the upright position and the declined position and thereby the second object is lifted, the free-rotation attachment mechanisms are rotated around the first and second objects or the frame as the frame is tilted, maintaining the first and second objects in an upright position, and the frame is pushed forward to transport the first and second objects while attached to the first and second free-rotation attachment mechanisms.

Further aspects of embodiments of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

LIST OF REFERENCE NUMERALS

Figure 1A:
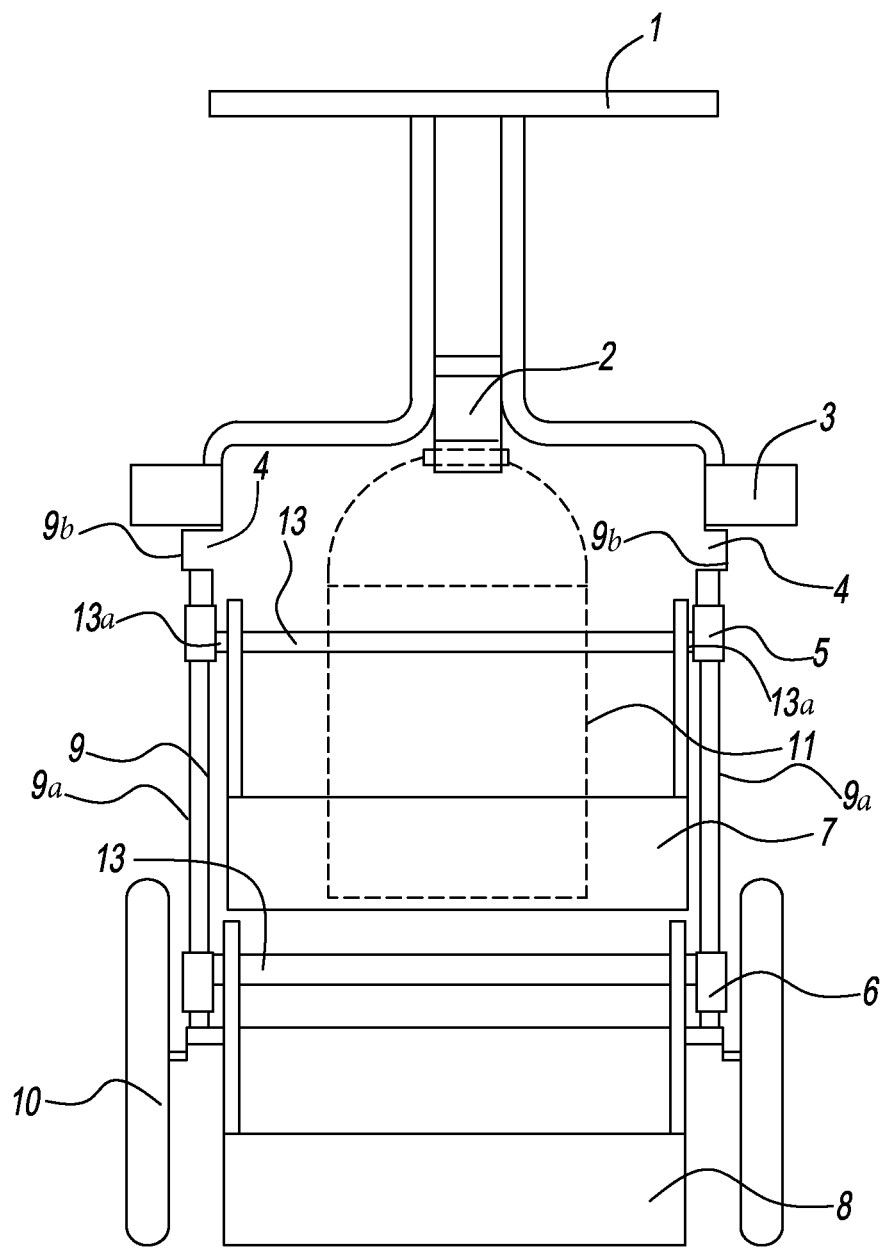
FIG. 1A is a front view of a multi-load automatically stabilizing hand cart holding two custom carrying structures, in an embodiment.

1 Handle
2 Bucket hook
3 Indexing hinge
4 Handle access groove
5 C-hook
6 C-hook on arm
7 Top open carrying structure
8 Bottom open carrying structure
9 Tube frame
10 Tire and wheel
11 Bucket
12 Arm
13 Carrying structure handle
14 Carrying structure side-panels
15 Carrying structure base
16 Mesh carrying structure body
17 Axle
18 Handle portion of indexing hinge
19 Bottom portion of indexing hinge
20 Bucket handle

DETAILED DESCRIPTION

Hand carts with custom carrying structures will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

The description is not to be taken in a limiting sense, but is made merely for the purpose of illustrating the general principles of the invention.

Figure 1B:
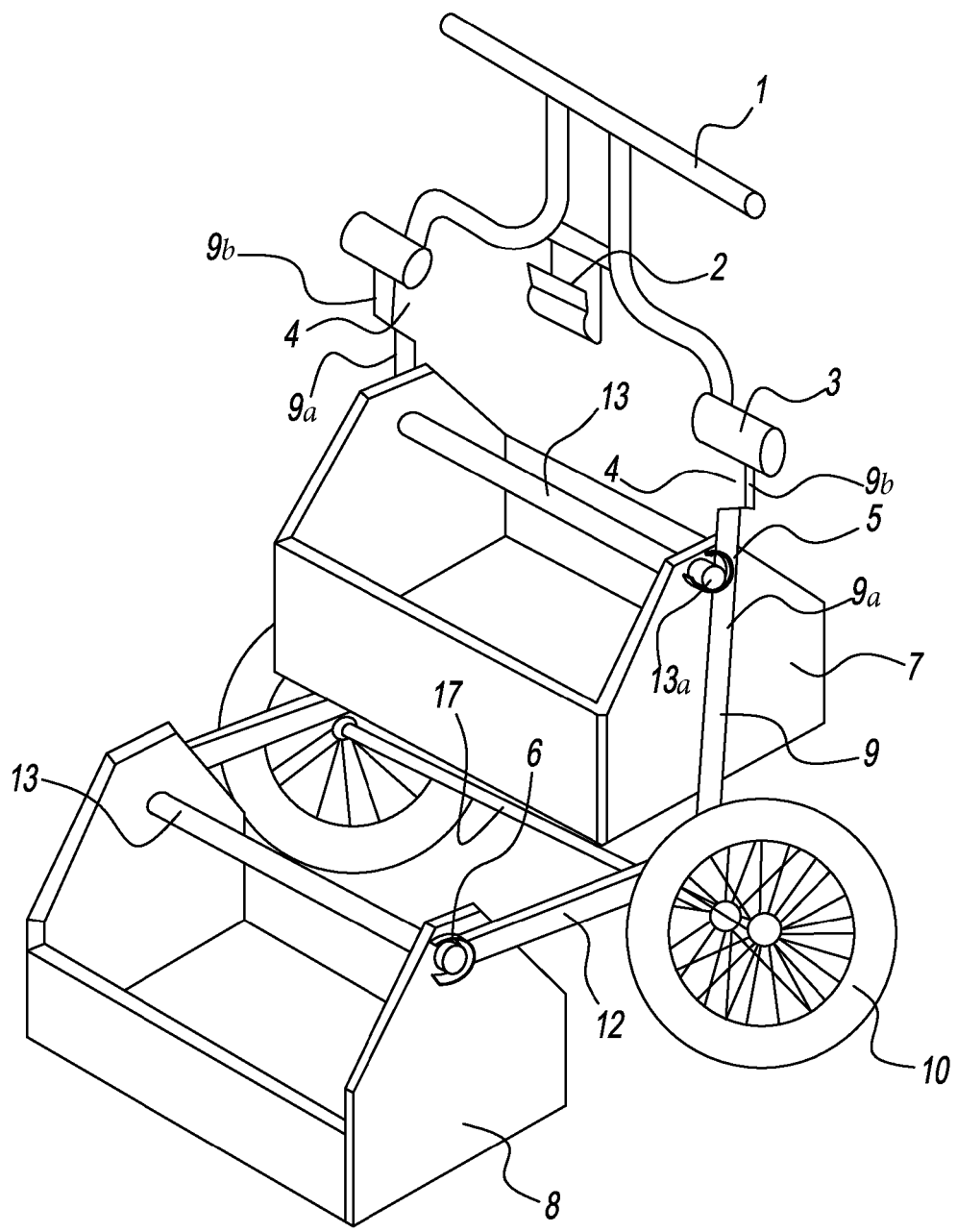
FIG. 1B is an isometric view of a multi-load automatically stabilizing hand cart holding two custom carrying structures, in an embodiment, in an upright position.

FIG. 1A is a front view of a multi-load automatically stabilizing hand cart holding two custom carrying structures, in an embodiment. FIG. 1B is an isometric view of a multi-load automatically stabilizing hand cart holding two custom carrying structures 7, 8, in an embodiment, in an upright position. The user can manipulate and move the cart with handle 1, which is connected to tube frame 9, which connects to axle 17, which connects to two wheels 10. More particularly, in addition to handle 1, axle 17 and wheels 10, frame 9 has a pair of side members 9a. The side members 9a are laterally spaced apart from one another with each having upper and lower end portions. The cart also has an object support structure in the form of a pair of arms 12 that are laterally spaced apart from one another with each having forward and rearward end portions. The arms 12 at their rearward end portions are respectively attached to the lower end portions of the side members 9a. The handle 1 extends transversely to and interconnects the upper end portions of the side members 9a. The axle 17 has opposite end portions, and extends transversely to and at its respective opposite end portions interconnects the lower end portions of the side members 9a. The wheels 10 respectively are movably connected to the opposite end portions of the axle 17 such that the wheels 10 are disposed outside of the arms 12 and the side members 9a of the frame 9. Thus, the frame 9 with the arms 12 are disposed between the wheels 10 and can be pivotally moved about a central axis defined by the wheels 10 and between upright and declined positions, as seen in solid line and broken line forms in FIG. 2, by manipulating the handle 1. Additionally, a first set or pair of C-hooks 6 are laterally spaced apart from one another and respectively connected to the forward end portions of arms 12 of the frame such that the frame 9 can be pushed forward when in the upright position to insert opposite side projections of an object, such as opposite end portions 13a of a handle 13 on a carrying structure 8, while resting on a support surface, into the first C-hooks 6. Also, a second set or pair of C-hooks 5 are respectively located directly on side members 9a of the frame 9 at a higher point than the arms 12 with the first C-hooks 6. More particularly, the second C-hooks 5 are laterally spaced apart and respectively connected to side members 9a of frame 9 at locations spaced respectively from wheels 10 and intermediately between the upper and lower end portions of the side members 9a. Handle access grooves 4 are defined in the frame 9 at intermediate portions 9b of the side members 9a located adjacent to the second C-hooks 5. The intermediate portions 9b of side members 9a, in defining the grooves 4, are offset in opposite directions away from one another and the remainder of the frame 9 toward outside of the frame 9. These grooves 4 are open both above and below the side members 9a as well as toward one another and the inside of the frame 9 so as to enable aligning opposite end portions 13a of a handle 13 on a respective carrying structure 7 with the grooves 4 from below the side members 9a and pivotally moving the frame 9 and side members 9a therewith downward to the declined position so as to thereby pass the opposite end portions 13a of the handle 13 on the carrying structure upward through the grooves 4 in the side members 9a and into alignment with the second C-hooks 5. The frame 9 can then be pulled rearward to insert and seat the opposite end portions 13a of the handle 13 on the carrying structure 7 in the second C-hooks 5. The grooves 4 thereby permit a user manipulating the cart from behind the handle 1 to retrieve a carrying structure 7 without having to maneuver the carrying structure around the frame 9 of the cart or changing his position to the front of the cart. Indexing hinge 3 allows for the handle 1 and bucket hook 2 portion of the frame to be folded down to reduce the size of the cart for storage and transportation. In other embodiments, this folding could be achieved in other ways, for example with holes and mating projections as are commonly used for folding tables and chairs. The indexing hinges 3 are also convenient places to add accessories or optional parts, including an additional pair of wheels.

Bucket hook 2 below handle 1 on frame 9 allows for a bucket 11, paint can or similar to be hung on the cart. The bucket 11 is shown in dashed lines to indicate where it would be placed-in this configuration it could not be hung from the cart at the same time that top carrying structure 7 is being held, because of the relative dimensions of the bucket 11 and carrying structure 7 and the placement of the second C-hooks 5 and hook 2.

Figure 2:
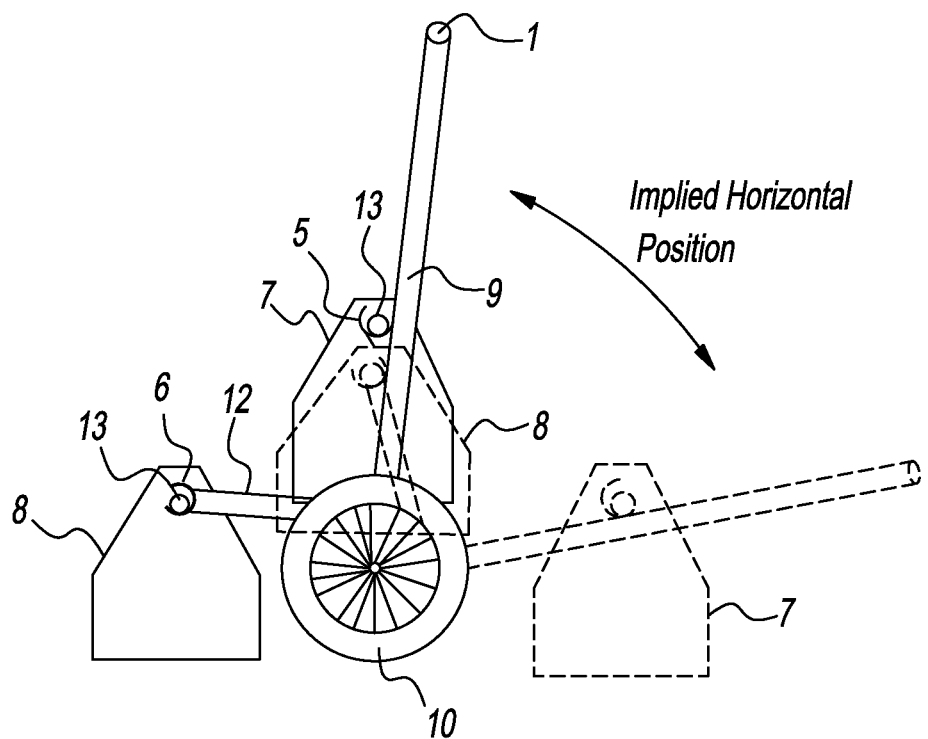
FIG. 2 is a side view diagram of a multi-load automatically stabilizing hand cart holding two custom carrying structures, in an embodiment, showing horizontal and vertical resting positions.

FIG. 2 is a side view diagram of a multi-load automatically stabilizing hand cart holding two custom carrying structures, in an embodiment, showing horizontal and vertical resting positions. The solid lines indicate the fully upright position, in which the bottom carrying structure 8 may be loaded and in which the carrying structures 7, 8 will rest in a balanced position. The dashed lines indicate the fully horizontal position, in which the top carrying structure 7 may be loaded and in which the carrying structures 7, 8 will rest in a balanced position.

Figure 3:
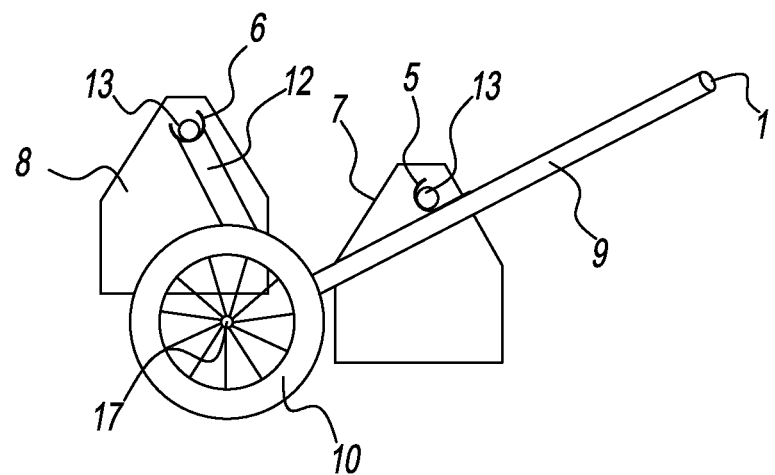
FIG. 3 is a side view of a multi-load automatically stabilizing hand cart holding two custom carrying structures, in an embodiment, in a typical transit position.

FIG. 3 is a side view of a multi-load automatically stabilizing hand cart holding two custom carrying structures, in an embodiment, in a typical transit position. Here, both carrying structures 7, 8 are off the ground. The long lever arm created by the frame 9 and the fact that one carrying structure is located on each side of the axle 17 result in minimal forces on the user pushing the cart.

Figure 4:
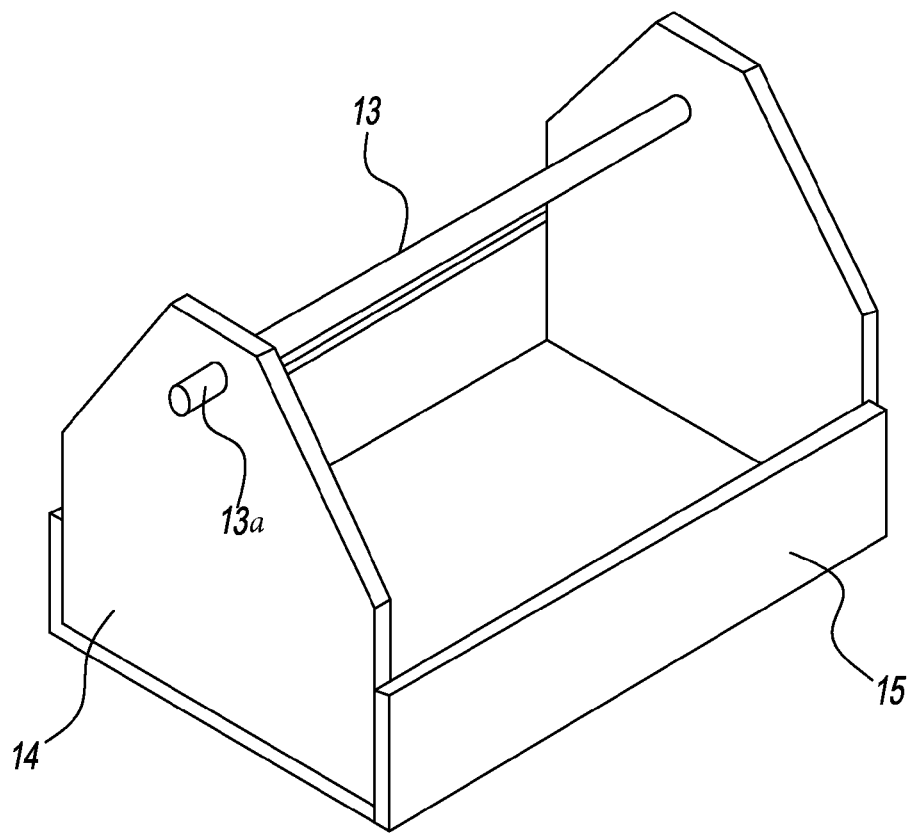
FIG. 4 is an isometric view of a custom carrying structure for a multi-load automatically stabilizing hand cart, in an embodiment.
Figure 5:
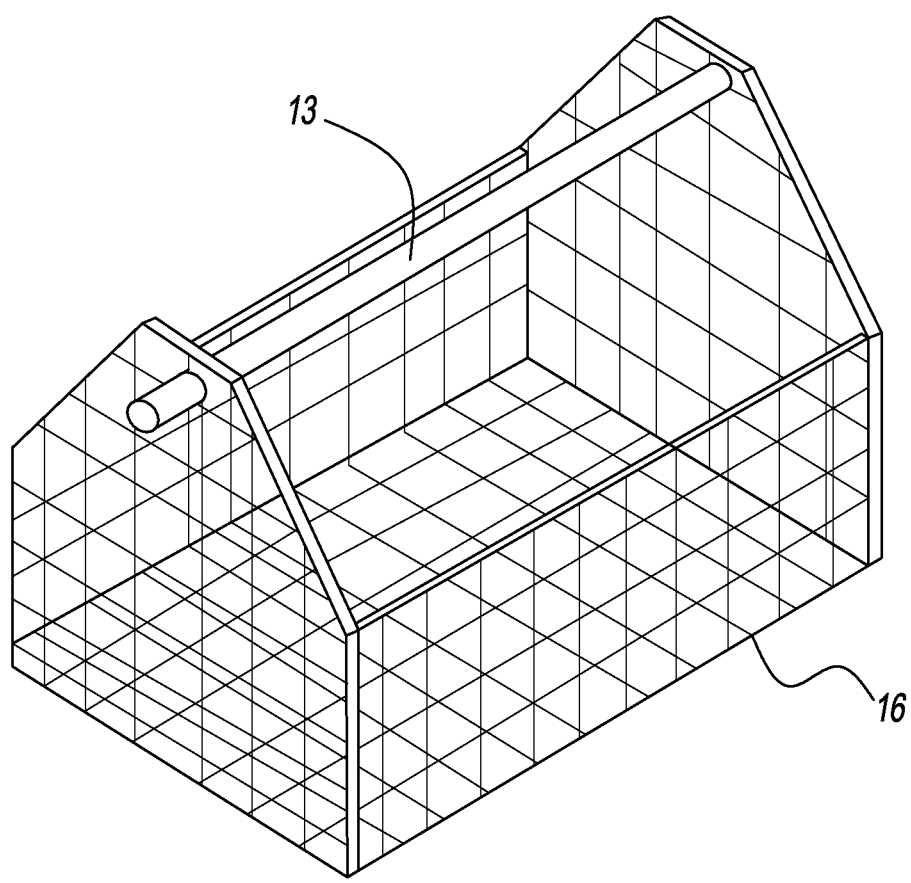
FIG. 5 is an isometric view of a mesh custom carrying structure for a multi-load automatically stabilizing hand cart, in an embodiment.

FIG. 4 is an isometric view of a custom carrying structure for a multi-load automatically stabilizing hand cart, in an embodiment. The carrying structure has a handle 13 that projects from each side panel 14 and a base 15. This is a basic carry structure—items can be placed inside, stored and moved. FIG. 5 is an isometric view of a mesh custom carrying structure for a multi-load automatically stabilizing hand cart, in an embodiment. It has a handle 13 that projects from each side and a mesh body 16. This mesh basket can have the same dimensions as the structure in FIG. 4 and can store and transport objects, with of course the possibility to use the mesh for drainage or an almost unobstructed access to light for visibility or UV radiation, making the structure useful for nursery work and agriculture. For example, starting plants can be placed in the mesh basket, which allows light from an existing light source to reach the plants. The plants can be both transported and grown on the cart. Examples: starting plants, gardening in structures. Additionally there are dedicated devices built to fit in the dimensions of the structures (and therefore in the C-hooks of the cart) to take advantage of ease of transport and a continued upright position due to the structure of the cart. Examples of this would be: food and beverage cooler, 12-24 volt batter charger, lights, PA speakers, water bottle carrier for sports, air compressor, small grill barbeque, paint tray for rolling, animal trap, bird/hamster cage, animal feeding bird/horse/goat, fertilizer salt spreader, field marking line dispenser, vacuum cleaner wet/dry shop vac, insulated and heated for temperature control, with seat for stool, with chair back, open side bottom padded for kneeling, pop up targets for weapons training, first aid kit, radio, luggage, portable fan air filter, hazardous waste containers, generator. Such items can be fitted for example with side projections for mounting directly in the C-hooks, or may be configured for secure attachment to a carrying structure of the kind previously described.

Figure 6:
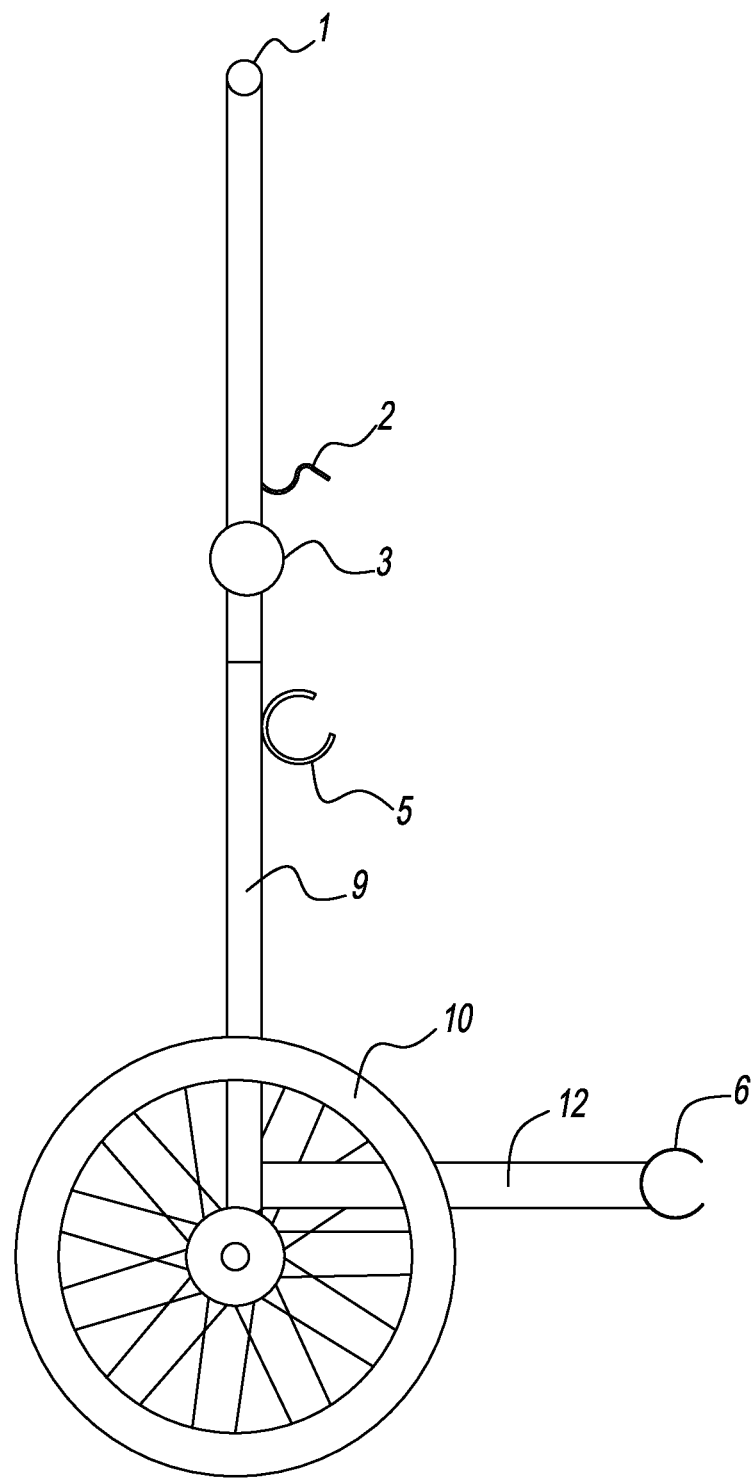
FIG. 6 is a side view of a multi-load automatically stabilizing hand cart, in an embodiment, in an upright position.

FIG. 6 is a side view of a multi-load automatically stabilizing hand cart, in an embodiment, in an upright position. Here, example dimensions are given, with a frame height of 49.5", C-hook diameter of 2⅜", and wheel diameter of 15.5".

Figure 7A:
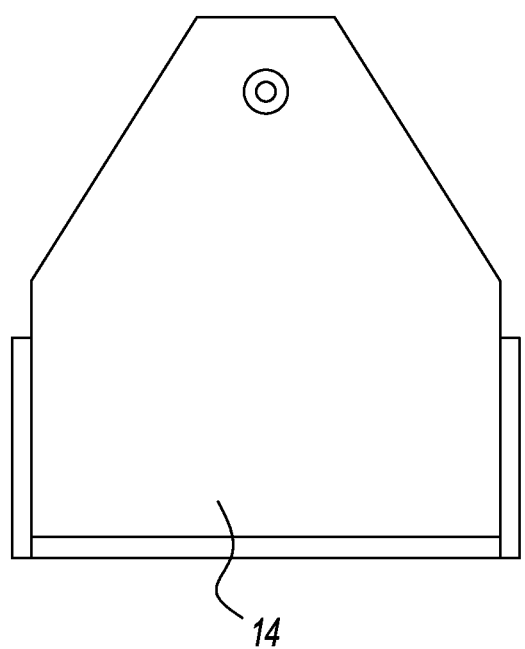
FIGS. 7A, 7B and 7C are side, front, and top views, respectively, of a custom carrying structure for a multi-load automatically stabilizing hand cart, in an embodiment.
Figure 7B:
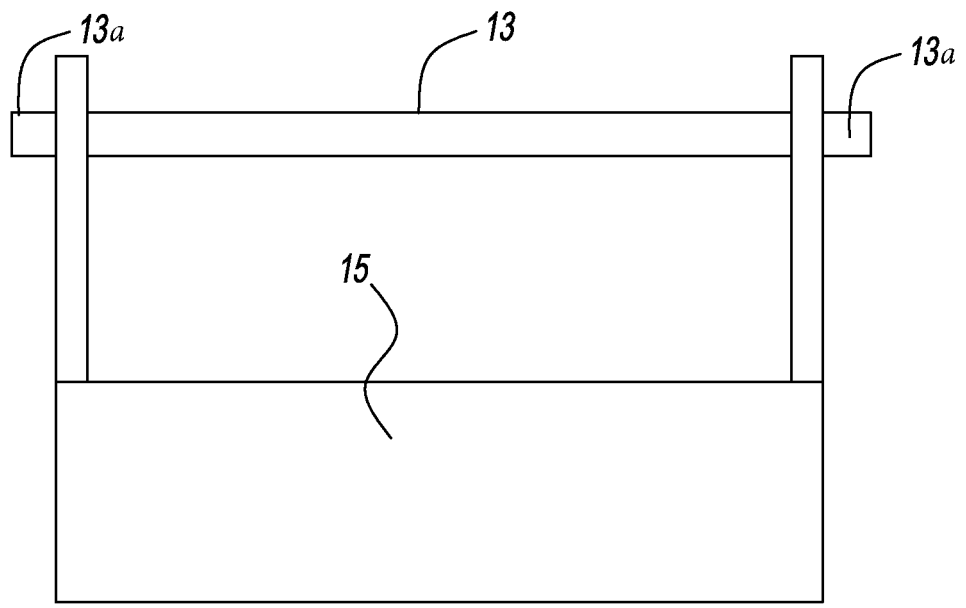
Figure 7C:
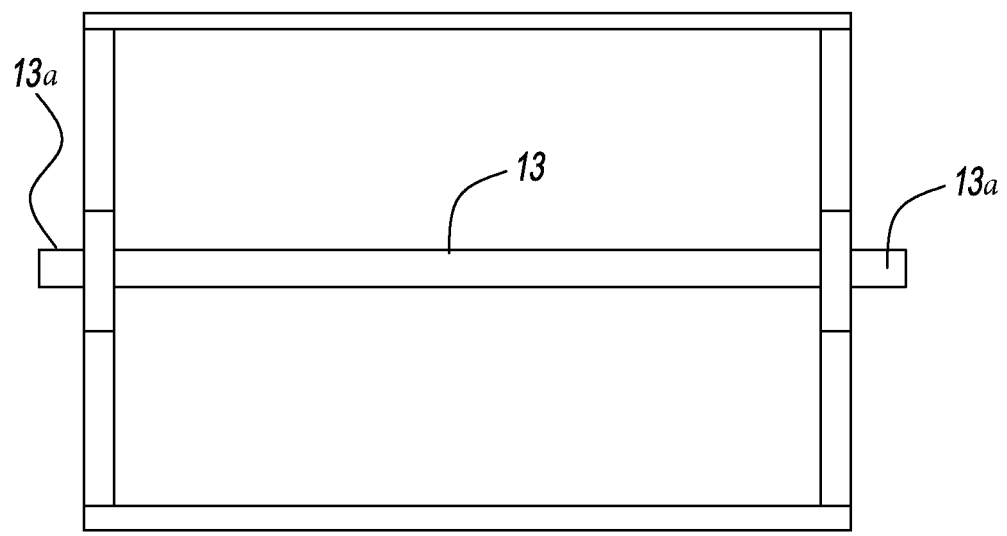

FIGS. 7A, 7B and 7C are side, front, and top views, respectively, of a custom carrying structure for a multi-load automatically stabilizing hand cart, in an embodiment. Example dimensions are provided corresponding to the dimensions given for the cart in FIG. 6.

Figure 8:
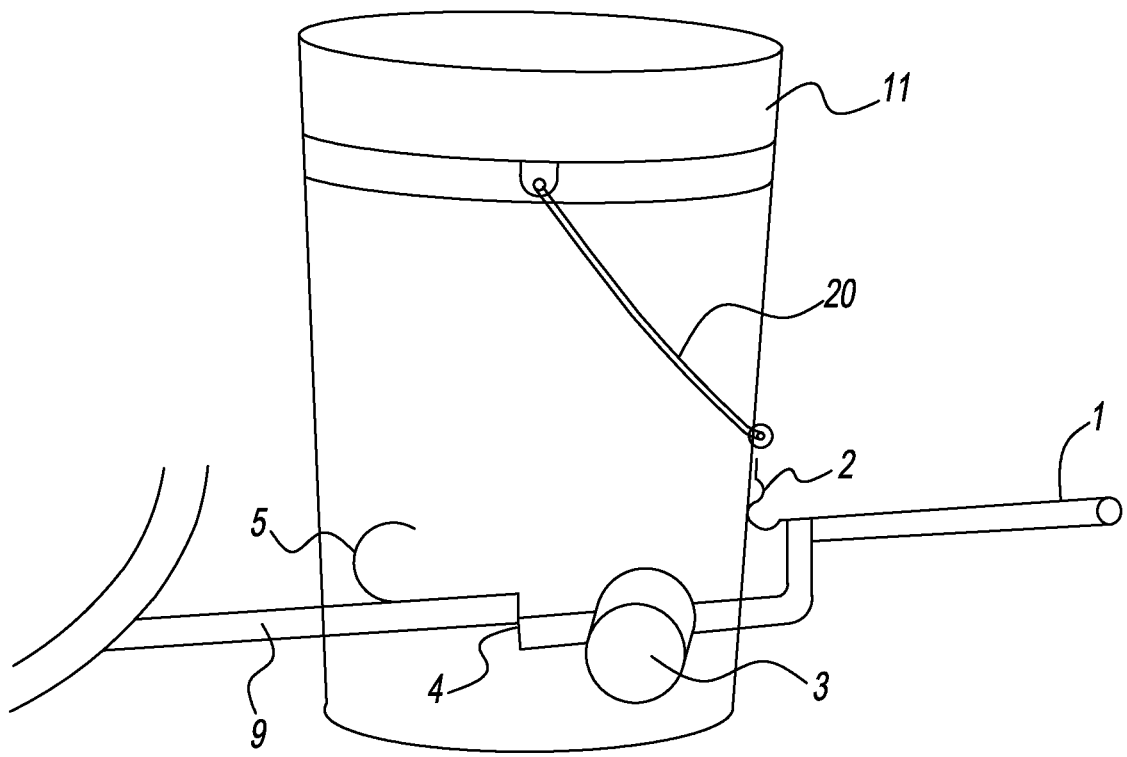
FIG. 8 is a side detail view of a multi-load automatically stabilizing hand cart, in an embodiment, declined and positioned to lift a bucket.

FIG. 8 is a side detail view of a multi-load automatically stabilizing hand cart, in an embodiment, declined and positioned to lift a bucket 11. The bucket hook 2 adds flexibility to the cart, allowing it to pick up many objects off the ground (or other support surface) utilizing the mechanical advantage of the cart. Like the carrying structures 7, 8, heavy buckets 11 can be lifted by the cart while the user manipulates the cart by the handle 1, without the user having to lift the bucket up with his or her hands. Here, the bucket hook 2 on the frame 9 is positioned below the handle 20 of the bucket 11. When the handle 1 of the cart is raised, the hook 2 will slip under the handle 20, catching and lifting the handle 20 and, as the cart is raised into an upright position, the bucket 11.

Figure 9:
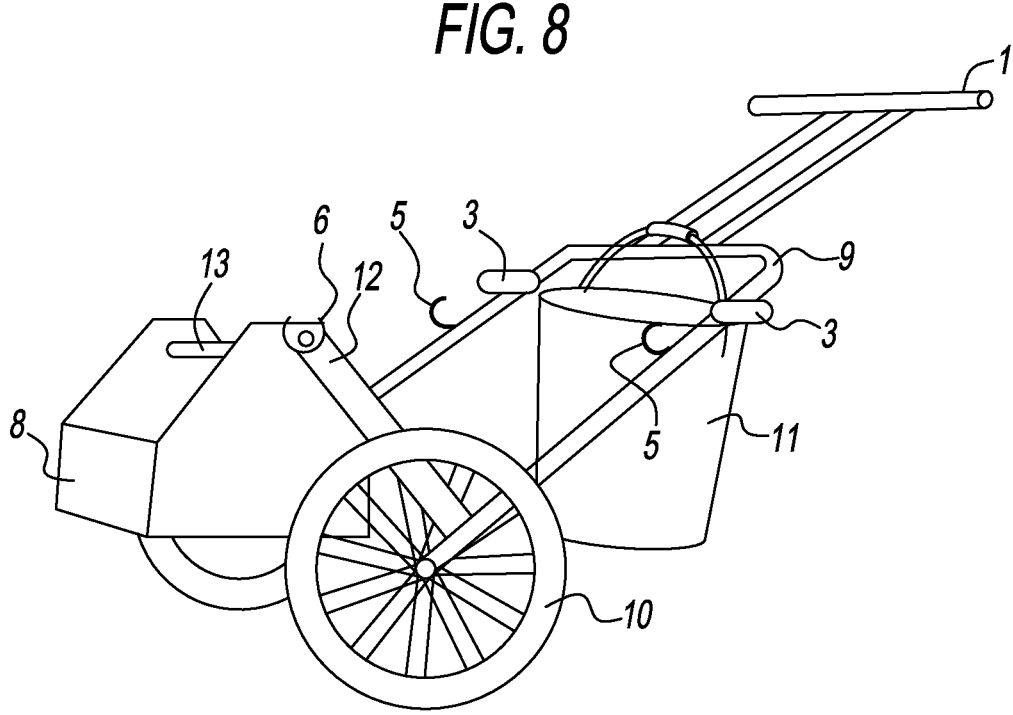
FIG. 9 is an isometric view of a multi-load automatically stabilizing hand cart, in an embodiment, carrying a carrying structure and bucket.

FIG. 9 is an isometric view of a multi-load automatically stabilizing hand cart, in an embodiment, carrying a carrying structure 8 and bucket 11. Here, the cart is in a transporting position, with both bucket 11 and carrying structure 8 lifted off the ground. The bucket 11 and carrying structure 8 are balanced, with one positioned on each side of the wheel 10 axle, and will not bump into each other in any cart position.

Figure 10:
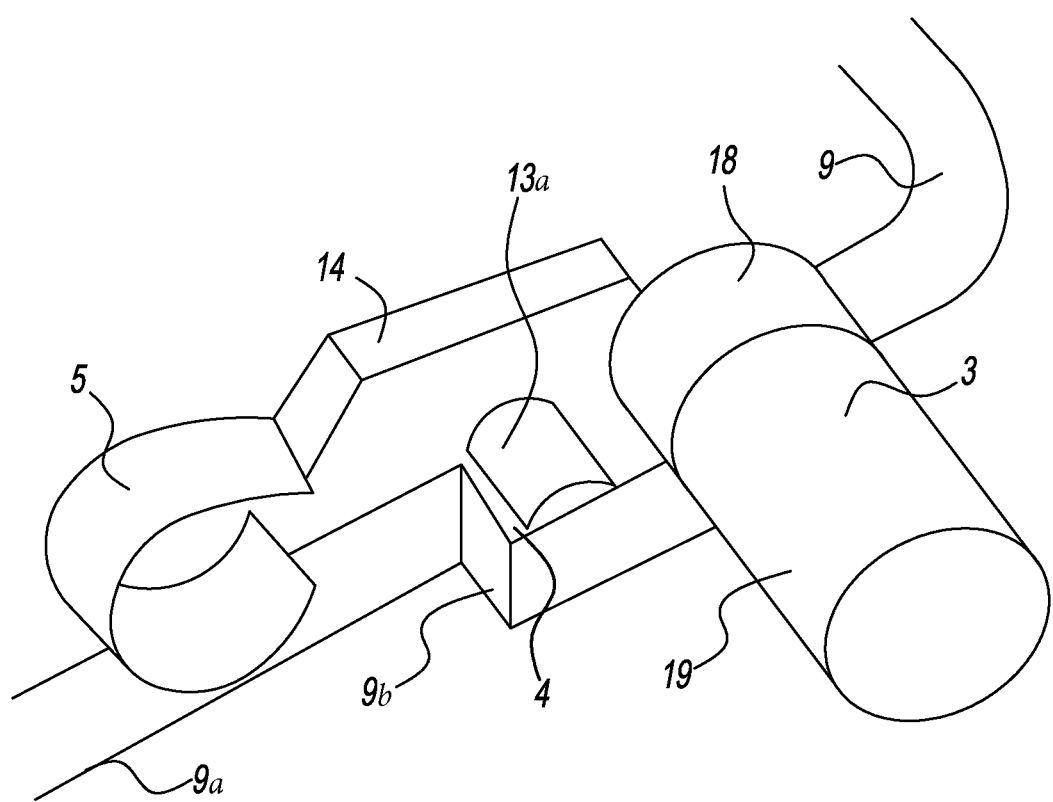
FIG. 10 is an isometric detail view of a multi-load automatically stabilizing hand cart, in an embodiment, in position to lift a carrying structure with top C-hooks.

FIG. 10 is an isometric detail view of a multi-load automatically stabilizing hand cart, in an embodiment, in position to lift a carrying structure with top C-hooks 5. The handle 13 of the carrying structure projects out of the side panel 14, and this projecting portion of the handle 13 slips through the handle access groove 4 when the cart frame is lowered over the carrying structure. Once the handle 13 is through the cart frame 9, the cart is moved backwards until the handle 13 is in the C-hook 5, at which point the cart is raised to lift the carrying structure off the ground. Also visible in this embodiment is indexing hinge 3 with handle portion 18 and bottom portion 19. These portions 18,19 are releasable locked in place in relation to one another, but when released can rotate with respect to one another to allow the handle to fold down against the rest of the frame for storage and transportation of the cart.

A new multi-load automatically stabilizing hand cart has custom carrying structures. Such carrying structures come in any number of shapes and designs, but many have one or more "handles" designed to fit into hooks on the hand cart. Typically, the carrying structures are sized according to the size and structure of the hand cart in order to fit into the hooks on the hand cart without contacting one another or the cart body, and without extending beyond the frame of the hand cart and creating difficulties when maneuvering the hand cart around obstacles. However, certain carrying structures deviate from this sizing, for example being so long that they must be mounted on a top set of hooks and obstruct the use of a second, lower set of hooks.

For stability, in some configurations the hand cart has hooks on either side and the carrying structures have corresponding handles on either side for insertion into the hooks. In some configurations, these handles on either side also extend across the length of the carrying structure so as to form one large handle, which can be gripped for carrying the carrying structure by hand, etc.

In some embodiments, one or more of the hand cart hooks is central and the carrying structures have a central handle, which again for some carrying structures extends the length of the carrying structure for hand-carrying. The side-handles configuration works well for certain carrying structures such as stools for which a top handle (or handle level with the hand cart "hooks") extending the length of the object is not desired.

In some embodiments, the hand cart has one or more lifting and carrying arms configured to pick up the carrying structures directly off the ground while a user stays in a standing position. A substantial lever arm between the user-manipulated top handle of the hand cart and the lifting and carrying arms allows the carrying structures to be lifted easily even when loaded with heavy objects.

In some embodiments, the lifting and carrying arms include a rounded C-hook into which the handles of the carrying structures can be inserted. One or more of the arms are positioned to be generally at the same height as the handles of carrying structures resting on the ground when the cart is in the full upright position, with the opening of the "C" generally at the front side. This allows the carrying structure handles to be easily inserted into the "C" when the carrying structures are resting on the ground, without a need for the user to bend over, and for the carrying structure to be easily lifted off the ground as the cart is placed in a declined position for ease of transport.

In some embodiments, the gap in the C-hook is designed to allow a standard carrying structure (with handle at C-hook height when resting on the ground) to be lifted off a surface up to 4" off the ground, such as a pallet. Even at the slight angle required to raise the arm to the height of the handle of such a carrying structure, the handle still fits easily into the C-hook horizontally. At higher heights, the handle will not enter horizontally in this design and a more difficult maneuver would be required for lifting. Because the lifting is performed by declining the top handle of the hand cart, a user's body weight is multiplied by the lever arm of the hand cart when lifting the carrying structures, for ease of lifting.

When such a cart is declined, the arm and C hook opening rotate accordingly upwards and the handle of an inserted carrying structure slides along the curve of the C hook due to the force of gravity and stays in an upright position. Thus, the carrying structure in the arm hooks will not tip over and spill its contents at any position between fully vertical and fully declined, but rather will stay fully upright, resting on the ground in the fully upright position.

In some embodiments, the length of these arms is typically chosen such that the carrying structures are easily lifted, the arm and C hook rotate sufficiently at a modest decline of the hand cart to keep the handle in the C hook when the hand cart hits a bump or obstacle, and so that carrying structures of typical size do not hit the axle or body of the hand cart during operation or interfere with the use of any other arms/hooks and carrying structures mounted therein. The arms may be such that when the cart is in a fully declined horizontal position with the top handle resting on the ground, the carrying structure in the arm hooks is held stably off the ground. The arms may be long enough that even if only one object is carried on the cart, in the upper C-hooks, the arms will support the cart in a fully upright position, allowing the cart to rest unattended with the object carried by the upper C-hooks hanging freely in the air.

The dimensions of the cart, such as the height of the handle, length and height of arms, location of C-hooks and width of the frame and C-hooks, size of C-hook openings, and the dimensions of structures intended to be carried by the cart may be selected such that two or more of the structures to be carried can be carried simultaneously in any position of the cart without those structures bumping into each other. Once the dimensions of, for example, the carrying structures are known, simple geometric properties allow the minimum cart dimensions for achieving this functionality to be determined. A good size for a carrying structure is roughly the size of a toolbox, therefore a generic form of the cart may be sized to allow for carrying structures shaped and sized like large toolboxes to be carried in this fashion. Such dimensions are useful for a wide variety of applications including construction, and do not generally result in loads greater than a human being can push.

In some embodiments, additional C-hooks have very short arms or are attached directly to the body of the hand cart at a position closer to the top handle than the C-hooks described previously. These C-hooks have their opening at the top (with the hand cart in a vertical position), so that the cart must be declined to a near-horizontal position to insert a handle into the C-hooks while the carrying structure is resting on the ground. In this position, a first carrying structure held in the C hook of the first arms is held upright above the ground and out of the way.

Such a hand cart is then inclined from this horizontal position to lift the second carrying structure off the ground. Again, the hook opening rotates upwards as the cart is rotated away from the insertion position and the inserted handle slides along the curved hook and keeps the carrying structure in an upright position. These additional C hooks are positioned at a height such that for carrying structures of ordinary size, this second carrying structure will not touch or interfere with the first carrying structure or the body of the hand cart during operation. In the full upright position, the second carrying structure is held stably upright and off the ground while the first carrying structure rests on the ground.

In this way, multiple carrying structures can be stably lifted directly off the ground (or pallet or other low surface) by the hand cart and transported with minimal effort supplied by the user. Additional features include zero-radius turning, due to wheels which are capable of rotating in opposite directions (e.g. that rotate independently), a hook for picking up and carrying a 5-gallon bucket (or other container, such as any 2.5-6 gallon bucket, with a handle of appropriate size/shape and strength), and a folding handle for compact storage and transportation.

The C-hooks provide a curved "socket" or cradle on which the handles can rest and rotate through a wide angle without sliding out. The exact shape of the curve and size of the opening can vary as long as the structure has this functionality. The C-hooks may extend between 180° and 330°, depending on the circumference of the arc, and can be any curved shape. In some embodiments, the C-hooks extend through 270°. The shorter the angle the C-hook extends through, the greater the likelihood that an object cradled therein will become dislodged when the cart is maneuvered over a bump or obstacle, depending in part on the shape and material of the C-hook, the shape of the object cradled therein, and the weight depending from the object cradled therein. The greater the angle, the more difficult it may be to insert an object. In some embodiments, a locking device is provided to close one or more of the C-hooks after insertion of an object, although this increases complexity. The angle and use of locking devices may depend on the intended use of the cart and whether it is likely to encounter many obstacles, bumps, changes in incline, etc.

The width and overall size of the C-hooks is determined by the strength necessary to hold objects, including on tilted ground where a significant amount of the carried objects' weight may fall laterally on a C-hooks.

In some embodiments, a bike brake or similar is used for quickly braking the cart from a significant speed and/or with a heavy load.

C-hooks or similar need not be used at all. Any type of connection between the cart and the carrying structures or other objects that allows the objects to rotate freely with respect to the frame of the cart, and therefore to be maintained in an upright position, falls under the scope of this invention. For example, connectors on the cart could rotate freely with respect to the frame, but connect securely to the carrying structures or other objects. Then, instead of the carrying structures sliding within the C-hooks, the rotating connectors would rotate (along with the carrying structures) with respect to the frame due to the weight of the carrying structures, maintaining the carrying structures in an upright position. For example, any type of clip or other connector journaled on the frame or a projection therefrom could be utilized to attach the carrying structures, with accompanying changes to the structure of the carrying structures used.

The invention is not limited to the particular embodiments illustrated in the drawings and described above in detail. Many variations of the invention will occur to those skilled in the art. All such variations are intended to be within the scope and spirit of the invention. Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of an invention. While the invention has been described with reference to specific illustrative embodiments, modifications and variations of the invention may be constructed without departing from the spirit and scope of the invention.

I claim:

1. A hand cart apparatus, comprising:
   a frame comprising
      a pair of side members being laterally spaced apart with each having upper and lower end portions,
      a handle extending transversely to and interconnecting the upper end portions of the side members, and
      an object support structure attached to and extending from the lower end portions of the side members,
   two wheels each movably coupled to the frame such that the wheels are disposed outside of the side members of the frame so that the frame is disposed between the wheels and can be pivotally moved about a central axis defined by the wheels and between upright and declined positions by manipulating the handle;
   a first pair of C-hooks laterally spaced apart from one another and connected to the object support structure of the frame, each first C-hook having an opening that faces in a first direction when the frame is in the upright position; and
   a second pair of C-hooks laterally spaced apart from one another and respectively connected to the side members at respective locations intermediately between the upper and lower end portions of the side members, each second C-hook having an opening that faces in a direction opposite to the first direction when the frame is in the declined position;
   wherein the side members have respective intermediate portions located adjacent to the second C-hooks, said intermediate portions being offset in directions away from one another and the remainder of the frame towards an outside of the frame so as to define grooves in the offset intermediate portions of the side members that are open both above and below the side members as well as toward one another and the inside of the frame so as to enable aligning opposite side projections on an object with the grooves from below the side members and pivotally moving the frame and the side members therewith downward to the declined position so as to thereby pass the opposite side projections on the object upward through the grooves in the side members and into alignment with the second C-hooks;
   wherein the frame so configured is adapted to be pushed forwards when in the upright position to insert the opposite side projections of an object resting on a support surface into the first C-hooks and to be pulled backwards when in the declined position to insert the opposite side projections of an object resting on a support surface into the second C-hooks after the opposite side projections of the object have passed upward through the grooves in the side members and into alignment with the second C-hooks.

2. The apparatus of claim 1, further comprising a first carrying structure having opposite side projections inserted in the first C-hooks such that the first carrying structure is disposed between the first C-hooks and movably hangs from and substantially below the first C-hooks so as to enable the influence of gravity on the first carrying structure to maintain the first carrying structure in an upright orientation as the handle of the frame is manipulated to pivotally move the frame about the central axis and between the upright and declined positions.

3. The apparatus of claim 2, further comprising a second carrying structure having opposite side projections inserted in the second C-hooks such that the second carrying structure is disposed between the second C-hooks and movably hangs from and substantially below the second C-hooks so as to enable the influence of gravity on the second carrying structure to maintain the second carrying structure in an upright orientation as the handle of the frame is manipulated to pivotally move the frame about the central axis and between the upright and declined positions.

4. The apparatus of claim 3, wherein the object support structure on the frame comprises a pair of arms being laterally spaced apart from one another with each arm having forward and rearward end portions, the rearward end portion of each of the arms being attached to the lower end portion of a respective one of the side members of the frame, the arms being pivotally moved with the frame about the central axis and between the upright and declined positions.

5. The apparatus of claim 4, wherein each of the arms extends in a length and direction such that the second carrying structure never contacts the first carrying structure when the frame and the arms therewith are pivotally moved about the central axis and between the upright and declined positions.

6. The apparatus of claim 5, wherein the second C-hooks are respectively connected to the side members of the frame above where the first C-hooks respectively connects to the arms and wherein the second carrying structure extends lower than where the first C-hooks connect to the arms.

7. The apparatus of claim 3, wherein the opposite side projections on each of the first and second carrying structures are outwardly projecting opposite end portions of handles thereon.

8. The apparatus of claim 3, wherein the first and second pairs of C-hooks are curved such that the respective opposite side projections of the first and second carrying structures, respectively hanging from the first and second pairs of C-hooks, will slide along the first and second pairs of C-hooks and thereby enable the first and second carrying structures to remain in the upright orientations when the frame is pivotally moved about the central axis and between the upright and declined positions.

9. The apparatus of claim 1, wherein the frame also comprises an axle having opposite end portions, the axle extending transversely to and at the respective opposite end portions thereof interconnecting the lower end portions of the side members, the two wheels movably connected respectively to the opposite end portions of the axle such that the wheels disposed outside of the frame can rotate in opposite directions, allowing for zero-radius turning of the frame.

10. The apparatus of claim 1, wherein the first and second pairs of C-hooks are configured such that one of the pairs of C-hooks is in front of the central axis of the wheels and the other pair of C-hooks is behind the central axis of the wheels when the frame is in a position between the upright and declined positions.

11. The apparatus of claim 1, further comprising a handle hook connected to the frame adjacent to and below the handle of the frame that allows an object to be picked up from below the frame and to hang between the side members of the frame from the handle hook on the frame.

12. The apparatus of claim 1, further comprising an indexing hinge attached to the frame and allowing a top portion of the frame to be folded down to reduce its size for transportation and storage.

13. A carrying structure comprising a body and a pair of opposite side projections mounted thereon, the body configured to be carried by insertion of the opposite side projections into the first or the second pair of C-hooks of the apparatus of claim 1, wherein the opposite side projections are formed by outwardly protruding opposite ends of a handle extending the length of the carrying structure.

14. A method of using the apparatus of claim 1, comprising pushing the frame forwards in the upright position until the first C-hooks surround opposite side projections of a first object, tilting the frame back and thereby lifting the first object, declining the frame to the declined position where the opposite side projections of a second object pass upward through the grooves from below the frame such that the second C-hooks are aligned with the opposite side projections of the second object, pulling the frame backwards until the second C-hooks surround the opposite side projections of the second object, tilting the frame into an intermediate position between the upright position and the declined position and thereby lifting the second object, and pushing the frame forward to transport the first and second objects.

15. The method of claim 14, further comprising sliding the opposite side projections of the first and second objects in the C-hooks as the frame is tilted, maintaining the first and second objects in respective upright orientations at all times due to the influence of gravity on the first and second objects.

16. The method of claim 14, further comprising tilting the frame into the upright position wherein the first object is resting on a support surface and the second object is hanging in an upright orientation in the air due to the influence of gravity on the second object and leaving the frame in that position where it stays without further application of force.

17. The method of claim 14, further comprising tilting the frame into the declined position wherein the second object is resting on a support surface and the first object is hanging in an upright orientation in the air due to the influence of gravity on the first object and leaving the frame in that position where it stays without further application of force.

18. A hand cart apparatus, comprising:
a frame comprising
  a pair of side members being laterally spaced apart with each having upper and lower end portions,
  a handle extending transversely to and interconnecting the upper end portions of the side members, and
  an axle having opposite end portions, the axle extending transversely to and at the respective opposite end portions thereof interconnecting the lower end portions of the side members;
a pair of arms being laterally spaced apart from one another with each having forward and rearward end portions, the rearward end portion of each of the arms being attached to the lower end portion of one of the side members,
two wheels each movably connected to one of the opposite end portions of the axle such that the wheels are disposed outside of the arms and the side members of the frame so that the frame with the arms are disposed between the wheels and can be pivotally moved about a central axis defined by the wheels and between upright and declined positions by manipulating the handle;
a first pair of C-hooks laterally spaced apart from one another and respectively connected to the forward end portions of the arms, each first C-hook having an opening that faces in a first direction when the frame is in the upright position; and a second pair of C-hooks laterally spaced apart from one another and respectively connected to the side members at respective locations intermediately between the upper and lower end portions of the side members, each second C-hook having an opening that faces in a direction opposite to the first direction when the frame is in the declined position;

wherein the side members have respective intermediate portions located adjacent to the second C-hooks, said intermediate portions being offset in opposite directions away from one another and the remainder of the frame toward outside of the frame so as to define grooves in the offset intermediate portions of the side members that are open both above and below the side members as well as toward one another and the inside of the frame so as to enable aligning opposite side projections on a carrying structure with the grooves from below the side members and pivotally moving the frame and the side members therewith downward to the declined position so as to thereby pass the opposite side projections on the carrying structure upward through the grooves in the side members and into alignment with the second C-hooks;

wherein the frame so configured is adapted to be pushed forwards when in the upright position to insert the opposite side projections of a carrying structure resting on a support surface into the first C-hooks and to be pulled backwards when in the declined position to insert the opposite side projections of a carrying structure resting on a support surface into the second C-hooks after the opposite side projections of the carrying structure have passed upward through the grooves in the side members and into alignment with the second C-hooks.

19. The apparatus of claim 18, further comprising a handle hook connected to the frame adjacent to and below the handle of the frame that allows an object to be picked up from below the frame and to hang between the side members of the frame from the handle hook on the frame.

* * * * *